United States Patent
Harris et al.

(10) Patent No.: US 11,256,748 B2
(45) Date of Patent: Feb. 22, 2022

(54) COMPLEX MODELING COMPUTATIONAL ENGINE OPTIMIZED TO REDUCE REDUNDANT CALCULATIONS

(71) Applicant: Riivos, Inc., San Francisco, CA (US)

(72) Inventors: C. Lee Harris, Jackson, WY (US); Frederick Brandt, Mill Valley, CA (US)

(73) Assignee: RIIVOS, INC., San Francisco, CA (US)

( * ) Notice: Subject to any disclaimer, the term of this patent is extended or adjusted under 35 U.S.C. 154(b) by 372 days.

(21) Appl. No.: 16/206,835

(22) Filed: Nov. 30, 2018

(65) Prior Publication Data

US 2020/0175072 A1    Jun. 4, 2020

(51) Int. Cl.
*G06F 16/901*    (2019.01)
*G06F 16/903*    (2019.01)

(52) U.S. Cl.
CPC .... *G06F 16/9024* (2019.01); *G06F 16/90348* (2019.01)

(58) Field of Classification Search
CPC ................... G06F 16/9024; G06F 16/90348
See application file for complete search history.

(56) References Cited

U.S. PATENT DOCUMENTS

| | | |
|---|---|---|
| 5,634,113 A | 5/1997 | Rusterholz |
| 5,938,760 A | 8/1999 | Levine et al. |
| 6,067,644 A | 5/2000 | Levine et al. |
| 6,108,698 A | 8/2000 | Tenev et al. |
| 7,614,037 B2 | 11/2009 | Gavrilov |
| 7,660,705 B1 | 2/2010 | Meek et al. |
| 7,743,370 B1 | 6/2010 | Krablin et al. |
| 7,814,427 B2 | 10/2010 | Cook et al. |
| 7,831,526 B1 | 11/2010 | Crawford et al. |
| 9,152,523 B2 | 10/2015 | Gargash et al. |
| 9,342,510 B1 | 5/2016 | Mohr et al. |
| 9,916,297 B1* | 3/2018 | Greenbaum ........ G06F 16/9024 |
| 10,372,807 B1* | 8/2019 | Greenbaum ........ G06F 40/177 |
| 2004/0002891 A1 | 1/2004 | Chen et al. |
| 2005/0114802 A1 | 5/2005 | Beringer et al. |
| 2005/0216482 A1 | 9/2005 | Ponessa |
| 2005/0257193 A1 | 11/2005 | Falk et al. |
| 2007/0234018 A1 | 10/2007 | Feiste |
| 2008/0077856 A1 | 3/2008 | Gazzillo |

(Continued)

OTHER PUBLICATIONS

Jourdan et al., "Static Timing Analysis of Real-Time Systems," ACM SIGPLAN Notices, 30 (11): 79-87, Nov. 1995.

(Continued)

*Primary Examiner* — Matthew J Ellis
(74) *Attorney, Agent, or Firm* — Davis Wright Tremaine LLP; Heather M. Colburn

(57) ABSTRACT

A method of efficiently computing values for a data structure having cells having dependencies is disclosed. The data structure may encode complex system. The complex system data structure is traversed to produce a directed graph. The nodes of the directed graph are assigned a depth and labeled as circular or non-circular. Nodes having a base depth are terminal and correspond to cells having known values. The nodes are assigned to depth lists, which are processed until all values have been calculated or a maximum number of attempts to process the lists is reached.

22 Claims, 8 Drawing Sheets

(56) References Cited

U.S. PATENT DOCUMENTS

| | | | |
|---|---|---|---|
| 2008/0276209 A1 | 11/2008 | Albrecht et al. | |
| 2009/0150426 A1* | 6/2009 | Cannon | G06F 40/18 |
| 2009/0288059 A1 | 11/2009 | Dimou et al. | |
| 2014/0143110 A1 | 5/2014 | Qin et al. | |
| 2016/0070740 A1 | 3/2016 | Vermeulen et al. | |
| 2016/0259832 A1* | 9/2016 | Shore | G06F 16/9024 |
| 2017/0262276 A1 | 9/2017 | Zongker | |
| 2017/0364534 A1* | 12/2017 | Zhang | G06N 5/04 |
| 2018/0203838 A1* | 7/2018 | Hiatt | G06F 16/285 |

OTHER PUBLICATIONS

Reichert et al., "Dealing with forward and backward jumps in workflow management systems," Software and Systems Modeling 2 (1):37-58, Mar. 2003.

\* cited by examiner

Prior Art

FIG. 1

Calculating node depth

COMPLEX MODELING COMPUTATIONAL ENGINE OPTIMIZED TO REDUCE REDUNDANT CALCULATIONS

CROSS-REFERENCES TO PRIORITY AND RELATED APPLICATIONS

Related to this application is U.S. patent application Ser. No. 15/134,359, filed Apr. 20, 2016, entitled "Generating and Using a Cyclic Graph to Calculate Solutions in Complex Modeling" to Harris (hereinafter "Harris").

The entire disclosure of the application recited above is hereby incorporated by reference, as if set forth in full in this document, for all purposes.

FIELD OF THE INVENTION

The present disclosure generally relates to a complex modeling engine that performs calculations, such as efficiently calculating values in a complex system. The disclosure relates more particularly to apparatus and techniques for performing calculations resulting in values for a complex system wherein the calculations are ordered to reduce the overall number of attempted calculations while calculating values for a complex system.

BACKGROUND

Solving (i.e., calculating values from inputs and a model) of complex models, predictive models, and other large models can require a substantial amount of computation, with complicated dependencies between values. In some cases, the amount of computation is unavoidable, but in other cases, the same output can be obtained with more computation steps and with fewer computation steps. When the input to a complex model is already large (e.g., 50,000 values), the number of intermediate values and rules can be much larger (e.g., hundreds of thousands or millions). Because a single input may drive multiple intermediate values, a change in only a few values may cascade throughout the entire model or may stay confined to only a few values. This effect makes it difficult to avoid recalculation of the same values when trying to solve a model for given inputs. Determining an order in which to calculate values that will efficiently yield a solution of the system is challenging.

SUMMARY

In an embodiment, a method for efficiently computing values for a data structure having cells and dependencies is disclosed. The method includes receiving a system data structure encoding a system having a plurality of cells, each cell associated with one of a plurality of rows, each cell comprising either a cell value or a cell calculation, wherein at least one cell calculation has a dependency that takes as input contents of another cell. The method traverses the system data structure to produce a directed graph data structure, the directed graph data structure having a plurality of nodes, each node corresponding to a plurality of cells within a row of the plurality of rows, the plurality of nodes including one or more terminal nodes that correspond to cells with values independent of contents of cells of other rows and one or more non-terminal nodes that correspond to cells comprising at least one cell comprising a cell calculation that has a dependency on a cell of another row, the directed graph data structure further having a plurality of edges, each edge connecting a pair of nodes, wherein an edge of the plurality of edges corresponds to a dependency between cells corresponding to the nodes connected by the edge, each non-terminal node of the one or more non-terminal nodes having a dependency on at least one cell of at least one driver node. The method further traverses the directed graph data structure to assign an assigned depth value to each node such that each one or more terminal nodes are assigned a base depth and each non-terminal node of one or more non-terminal nodes is assigned an assigned depth value based on a depth of a driver node of the at least one driver node. The method further constructs a plurality of depth lists, wherein each depth list has a count and refers to the nodes having a depth value corresponding to the count. The method processes a depth list in the plurality of depth lists by, for each node in a depth list, evaluating if a plurality of values corresponding to the node can be calculated, and if so, calculating the plurality of values and removing the node from the depth list. The method repeats processing the depth list for a maximum number of times while the depth list refers to at least one node.

In one embodiment, each cell is further associated with one of a plurality of time periods, wherein cells may depend on contents within other time periods, creating dependencies between cells having the same row label.

In another embodiment, traversing the directed graph data structure further comprises causing a stack data structure to refer to a current node being traversed by checking if the current node being traversed is referred to by the stack data structure, and if the current node being traversed is not referred to by the stack data structure, causing the stack data structure to refer to the current node. If the current node being traversed is referred to by the stack data structure, the method creates a circular node list in memory and causes a plurality of nodes referred to by the stack data structure to be referred to by the circular node list. The current node is noted as a circular node.

In one embodiment, as a row of the system data structure is processed, if a node corresponding to the cells of the row has already been processed, the method evaluates if a dependency from a cell is on a preceding time period or a succeeding time period, and, if not, labels the node as circular and if so, labels the node as not circular.

The depth list may further be processed by detecting if a detected node of the circular node list corresponds to cells including an aggregation calculation. If so, the cell contents of the corresponding cells of the detected node are set to a constant value. The cell calculations of the cells corresponding to the nodes of the circular node list are recalculated to evaluate the calculation produces a convergence of values. If a convergence of values is produced, values from the convergence of values are assigned to the cells corresponding to the nodes of the circular node list. If a convergence of values is not produced, processing of the depth list continues.

In another embodiment, a method for efficiently computing values for a data structure having cells and dependencies is disclosed. The method receives a system data structure encoding a system having a plurality of cells, each cell associated with one of a plurality of rows, each cell comprising either a cell value or a cell calculation, wherein at least one cell calculation has a dependency that takes as input contents of another cell. The method traverses the system data structure to produce a directed graph data structure and an all nodes list, the directed graph data structure having a plurality of nodes, each node corresponding to a plurality of cells within a row of the plurality of rows, the all nodes list comprising a point to each node of the plurality of nodes, wherein each node is labeled as either terminal or non-terminal, each node further labeled as circular or non-circular. The method assigns an assigned depth value to each node. The method constructs a plurality of non-circular and circular depth lists, wherein each non-circular depth list has a count and refers to the nodes labeled as non-circular having a depth value corresponding to the count and each circular depth list has a count and refers to the nodes labeled as circular having a depth value corresponding to the count. A depth list in the plurality of depth lists is processed by, for each node in a depth list, evaluating if a plurality of values corresponding to the node can be calculated, and if so, calculating the plurality of values and removing the node from the depth list. The method repeats processing the depth list for a maximum number of times while the depth list refers to at least one node.

The following detailed description together with the accompanying drawings will provide a better understanding of the nature and advantages of the present invention.

BRIEF DESCRIPTION OF THE DRAWINGS

Various embodiments in accordance with the present disclosure will be described with reference to the drawings, in which:

FIG. 1 illustrates the structure of a conventional model for an exemplary simplified complex system as might be used for a computational system that processes inputs and the model.

DETAILED DESCRIPTION

Figure 2:
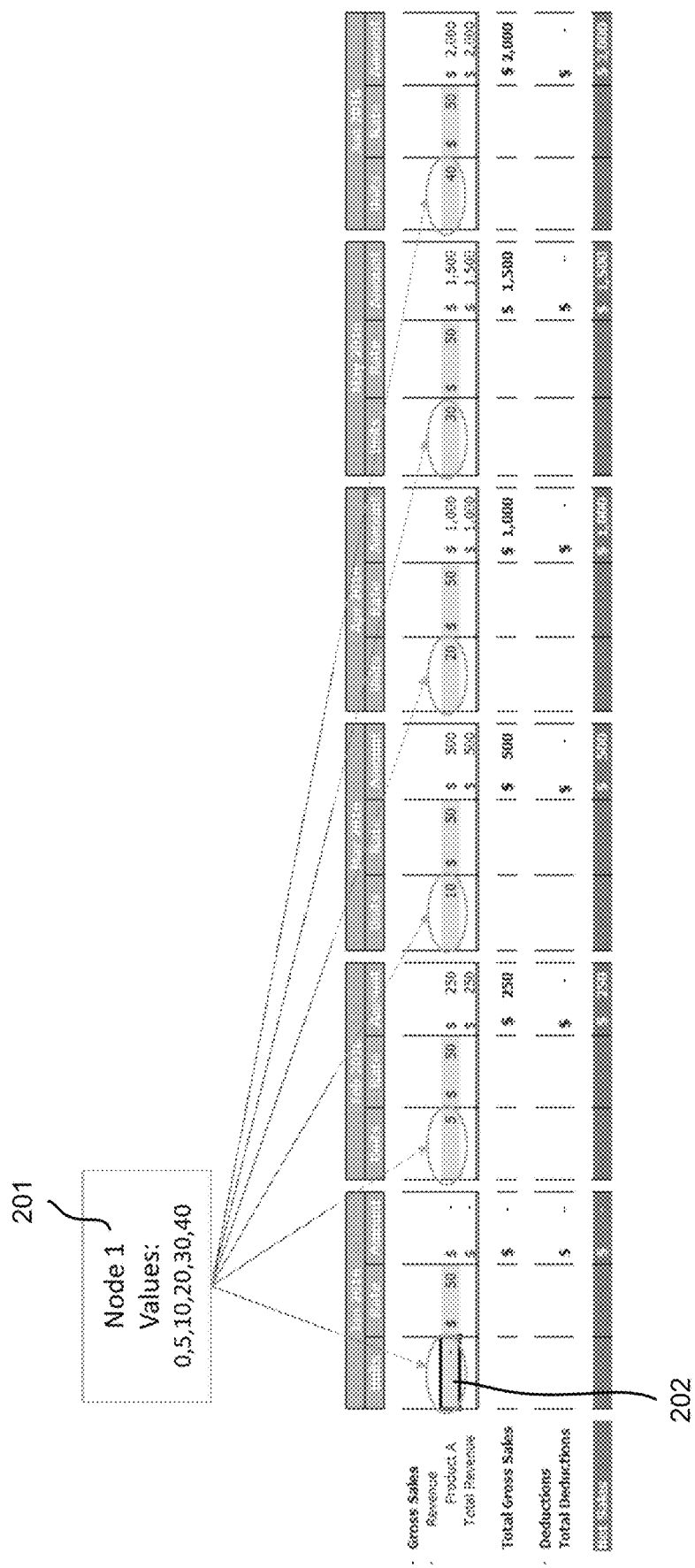
FIG. 2 illustrates a structure of a model for an exemplary simplified complex system that correspondences from a single node of a graph data structure to the values of a complex system that correspond to that single node.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In many of the embodiments of the disclosure, a computer system receives an initial complex system encoded in a data structure referred to herein as a "model." Examples of models include a mortgage planning model and possibly other financial system models, models for assessment of productivity of mines, and models for assessment of financial yield of oil and gas exploration, insurance risk planning, and/or supply chain management. In the general case, the model is represented in a data structure that is readable by a computer process that performs calculations according to the model and inputs provided. Often, the number of calculations the computer process performs is significant and can impose costs, such as cost of computing, delay between starting the computation and ending it, and the like.

The model data structure that encodes the complex system may be, for example, stored as a matrix or a spreadsheet, each having rows and columns defining cells and relationships between cells. The matrix or spreadsheet might also include cells and defining relationships between cells. The matrix may be fully defined, or may be a sparse matrix in which some cells are not defined. It may also be encoded as a series of rules describing relations between data in one or more databases. The complex system may include time periods, each representing days, months, quarters, years, or another time period. In one embodiment, the time periods may be displayed in columns.

Some time periods may further define columns for a units, rate, and amount. Rows may correspond to different values, such as cost of goods sold, operating expenses, and other inputs into a financial model. The values may be for different products, which may in turn be part of product lines. Specifying a row and column may identify a particular cell in the data structure. The complex system may specify that all cells exist for each row and column, or may allow for undefined cells. Rows and columns are conventionally arranged horizontally and vertically respectively but may be reversed.

As mentioned, some time periods may be further divided into columns corresponding to units, rate, and amount. The cells in these columns may be related by the expression "unit times rate equals amount" (a unit-rate-amount relationship), wherein the value in the cell in the unit column times the value cell in the rate column yields the value in the cell in the amount column. Not every time period need contain such columns or such a relation, and some columns may have other relations.

The complex system may have relations defined between cells in addition to the unit-rate-amount relationship. For example, the number of widgets sold in a time period may be a function of forecasted demand and forecasted part availability. Costs, for example, may in turn be a function of widgets built, which may interact with inventory and widgets sold. Cash and debt may be a function of costs and a revolving debt facility. As can be seen, even a fairly simple example can quickly have a great number of dependencies, some of which may be circular. A relation in which the value of one cell depends on the value of another cell or cells is called a dependency. Dependencies may be between cells in the same time period or between cells of different time periods. The relations need not be purely mathematical and may include, for example, conditional statements (e.g., if-then-else statements), loop statements, summations of multiple cells, statistical operations (e.g., mean, max, and min), and financial operations (e.g., time value of money calculations). Some cells may depend on aggregations of values in other cells, such as a summation or statistical operation that takes multiple cells as input to a function. The cells may in turn depend on aggregation of other cells, either over time or in the same time. For example, a total number of parts required in a time period may depend on the number of units of a product A and units of a product B that both use the part as a component. The units of each product made may in turn depend on units in different geographical locations. Calculating the total number of a part needed may require first summing the product A and product B for each geography, and then summing product A and product B, creating a hierarchical aggregation function to determine the total number of a part needed.

Figure 1:
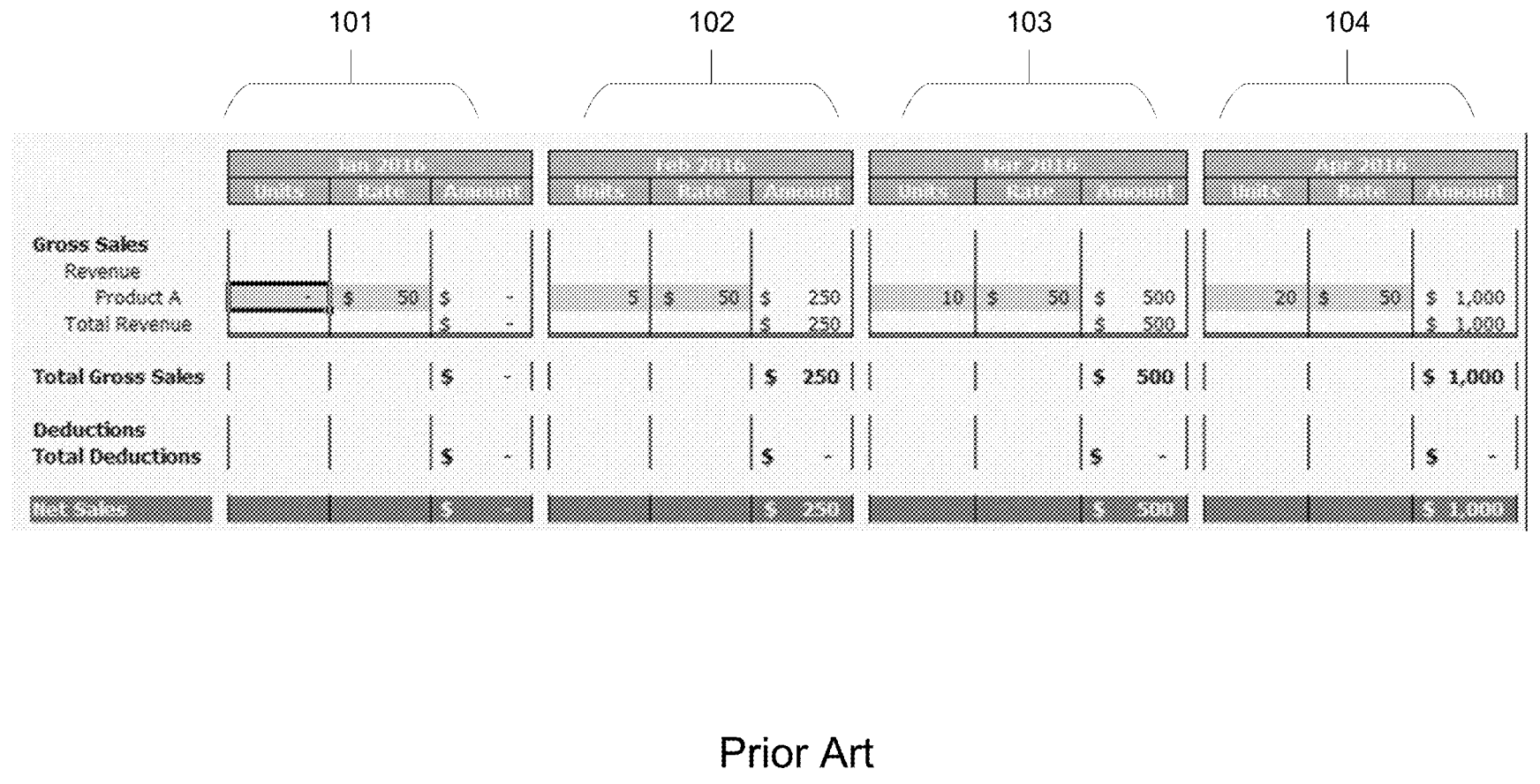

A spreadsheet is shown in FIG. 1 to illustrate an example system. This system is simpler than a typical system in order to allow it to be illustrated. Time periods 101, 102, 103, and 104 for the months of January, February, March, and April, respectively, are shown, with each time period having a Unit-Rate-Amount relationship in it. Dependencies between cells are not shown in order to simplify the illustration.

Once the computer system receives the data structure encoding the complex system, a directed graph construction process may traverse the data structure to construct a graph encoded in a graph data structure. The graph data structure may be directed. The nodes of the graph data structure may correspond to, or reference, individual cells or cells which occupy the same row in different time periods. Nodes may be stored in a node object. As an example of the construction of a node from a system, if a "product A" row has a unit, rate, and amount column for each month of a year, then that may produce three nodes: one node corresponding to the monthly value of units of product A, another node corresponding to the monthly value of the rate corresponding to product A, and another node corresponding to the monthly value of the amount of some quantity due to product A. To further illustrate, the units of product A may be how many units of product A were sold, which may in turn depend on other values such as the number of units built as well as forecasted demand. The rate may correspond to a profit margin for product A, and the amount may correspond to the profit made selling product A. In the example, a single node corresponds to, for example, the units column across the twelve months of a year, but other combinations are possible. For example, a node may correspond to a year having quarterly values (a node corresponding to four cells) or a node may span three years, divided monthly (a node corresponding to 36 cells). As mentioned above, not every node need have a unit-rate-amount column. A row may contain only one column per time period, for example an amount entry. A "total gross sales" row may only have an amount, and therefore one node corresponds to the cells of that row.

FIG. 2 illustrates the cells which a single node 201 references. The spreadsheet of FIG. 2 is the spreadsheet of FIG. 1 with the months of May and June added. Node 201 would reference the cells in the units column of the Product A row of each time period. This includes, for example, cell 202, which is the units column of January in the Product A row. As those skilled in the art will appreciate, a more typical system would have a full year's worth of values, or perhaps multiple years of values, with years in the past representing historical data and years in the future storing predicted values used for, for example, financial planning.

Figure 3:
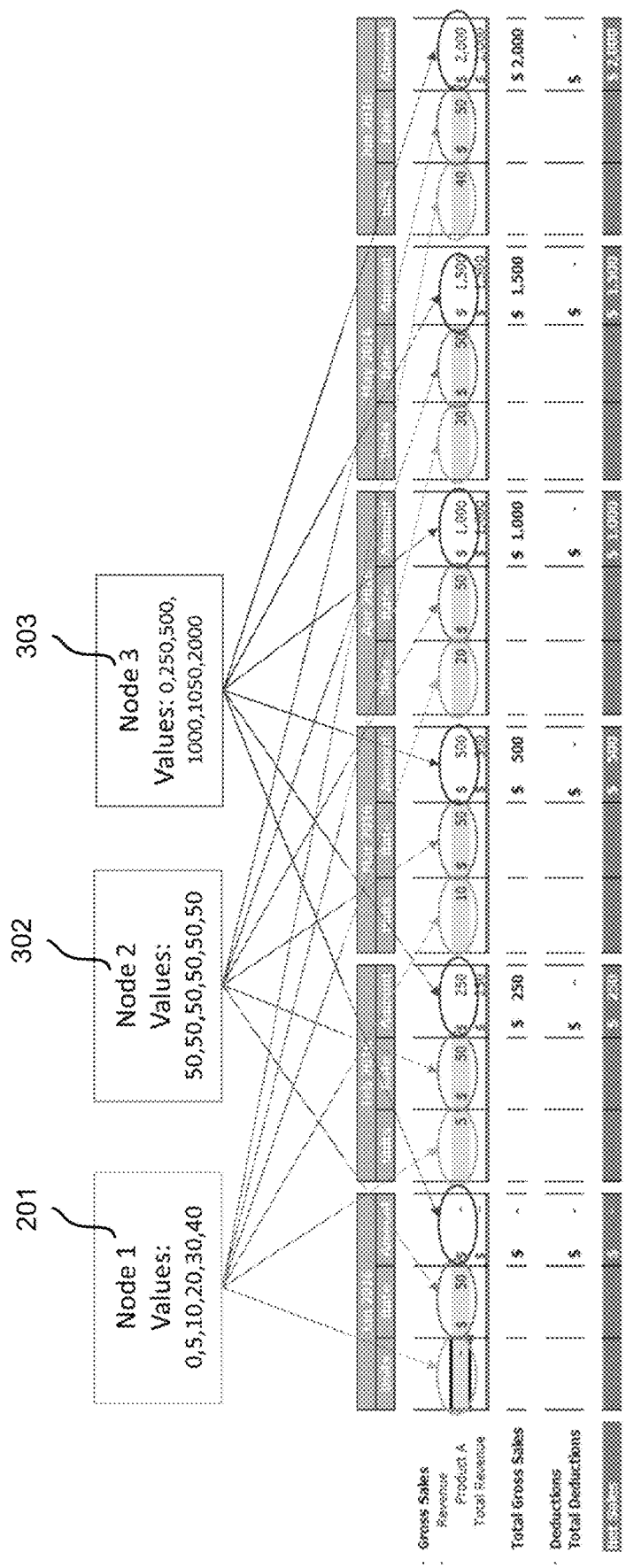
FIG. 3 illustrates a structure of a model for an exemplary simplified complex system with correspondences from multiple nodes of a graph data structure to the values of a complex system that correspond to those multiple nodes.

FIG. 3 illustrates node 2 (302) and node 3 (303), in addition to node 1 (201) of FIG. 2. Notice that each node may correspond to a column which is repeated in each time period.

The directed graph construction process builds the directed graph by going from row to row and identifying relationships between the units/rate/amount cells, with a node corresponding to each of the units, rate, and amount columns. Once the nodes are identified, the vertices of the graphs are added by adding directed edges from nodes referencing cells that rely on other cells as input values. Edges may be stored in the node object as an edge structure or in another data structure. An edge stored in a node object may store a driver node object on which the node object depends, indicating that the parent node object depends on the driver node object. Continuing with the product A example above, if the units of product A cells depend on the cells in a units column of a part B row, then there would be an edge running from the node corresponding to the units of product A to the node corresponding to the units column of part B. This edge from a units node of product A to a units node of part B indicates that a units of B value corresponding to the units of B node is an input to the units of product A node. The edge may be stored in the units of product A node object and point to the node referring to the units column of part B, indicating that the units column of part B is a driver node (or a child in the graph structure). This may also be stated by saying that some units value of product A in some time period (or multiple time periods) has a dependency on some (or multiple) units of part B value or by saying that the units of B node is a driver of the units node of product A. In some embodiments, the edge may run from one node to another regardless of whether one value in a time period relies on one value in the same or another time period, or if all time periods of a node rely on the same or other time periods of the other node. For example, a cell corresponding to the units of product A for the month of February may depend on (take as an input) the units of part B for January. Alternatively, the units of product A for February may depend on the units of part B for February. In yet another alternative, every cell corresponding to every month of product A may rely on the same month of part B. As another example, every month of product A may rely on the previous month of part B. In one embodiment, these example dependencies (one period, all periods, dependencies within the same period, and dependencies to different periods) would result in an edge running from the unit of product A node to the unit of part B node. A node may also have a back pointer to a node that has a pointer to it, allowing the determination of nodes that a node is a driver of.

As yet another example, often one of the values of the unit-rate-amount related values will be unknown and determined by the other two values in the same time period. For example, the amount may be unknown and calculated from the unit and rate values. In such an example, the amount node would depend on (have an edge going from the amount node to each of) the unit and rate nodes. As may be appreciated, the unit node, for example, may in turn depend on other values.

The directed graph construction process traverses the complex system data structure and builds a directed graph data structure corresponding to the complex system. Further explanation of the data structure and processing of the data structure to create a directed graph may be found in the Harris reference incorporated by reference above.

Some cells of the complex system data structure will have defined values. These values may be defined within the data structure or may be retrieved from a database and populated within the data structure. In order to process the complex system, as the computer system traverses the complex system data structure and builds the directed graph data structure, it will identify these cells having known values, as opposed to depending on other cells. Nodes corresponding to, or referencing, cells containing known values will not have dependencies and therefore will be terminal nodes, sometimes referred to as leaf nodes. Other nodes may depend on multiple other nodes, possibly creating cycles within the graph data structure. The nodes having dependencies will be referred to as non-terminal nodes. The terminal nodes may be labeled as having a base depth, such as a depth of zero, one, or null. The base depth indicates that the terminal nodes have no further dependencies. As the computer system traverses the complex system to build the graph data structure, it may also build another all nodes data structure containing pointers to all of the nodes. This all nodes data structure allows all nodes in the directed graph to be efficiently visited. The data structure may be, for example, a queue, stack, or map data structure. This data structure will be used, for example, to assign nodes to depth lists, after depths are assigned to the non-terminal nodes. In some embodiments, only non-terminal nodes are added to the all nodes data structure.

As directed graph construction process builds the directed graph, cells that have already been visited are tracked, for example by already being added to the directed graph data structure and to the all nodes data structure. If a cell is revisited, this indicates a possible circularity, which is checked to ascertain if the circularity is an apparent circularity. An apparent circularity is one in which the values corresponding to the node depend on values from a preceding time period or to a succeeding time period. That is, the dependencies are on values in different time periods, not the same time period. If such a calculation is part of the circularity, then the calculations for the nodes in the circular chain will not be circularly dependent, because the earlier or later periods will break the circularity. If the node is an apparent circularity, then it is not labeled as circular. Otherwise, the node is labeled as circular.

After building the directed graph data structure, a node depth calculation process may assign a depth to each node. In one embodiment, the depth of the terminal nodes is assigned the base depth, such as a depth of zero or one, while building the directed graph structure. In another embodiment, all depths, including the base depths, are assigned after the directed graph is built, either by traversing the graph data structure or by sequentially going through the all nodes data structure.

Node Depth Calculation

In one embodiment, after the directed graph data structure is built, a node depth process assigns a depth to the nodes. Generally, the depth of each node is calculated recursively as one more than the depth of its child (driver node) having the greatest depth. The node depth calculation method is described in detail below with reference to FIG. 4. Before beginning the recursive method of FIG. 4, an active stack data structure is initialized to be empty. In some embodiments, the active stack may be a stack, a queue, a map, a list, or a combination thereof. Advantageously, the active stack data structure may be optimized for insertion, deletion, and querying for the existence of an element in the active stack. It is used to hold a reference (or pointer) to all nodes currently being processed for the node depth calculation.

The node depth process selects a node of the graph data structure as the current node to be recursively processed. The node may be chosen from the all-node data structure or may be selected by other means (e.g., chosen from the directed graph by picking a node without an assigned depth or chosen randomly).

In step 401, the method starts by calling the method with the chosen node, called the current node.

At step 403, the current node is checked to see if it already has a depth assigned. If so, the depth is returned at step 413 and the process ends. Processing may then proceed to a by selecting a next node, if any nodes are still unprocessed.

At step 404, the current node is checked to see if the values of the cells reference by the current node are known (supplied as part of initial conditions). If so, the node is a terminal node and, at step 405, the node is assigned the base depth (for example, a value of zero). After the current node is assigned the base depth, the depth is returned at step 413 and the method ends.

If the current node is non-terminal node (the values in the cells corresponding to the node are not known), then the active stack is checked to see if it contains a reference to the node. If so, then the current node is a circular node and is processed as a circular node in step 407.

At step 407, the node depth process labels the current node as a circular node because a reference to it is already present on the active stack. The active stack may be an ordered stack, and all nodes lower on the stack (more recently entered or pushed on the stack) than the reference to the current node are stored as part of a circular chain. The nodes in the circular chain are also circular nodes and are labeled as such as well as associated with a reference to the circular chain which contains a reference to them. A parent node, which was the node that was being processed when the current node was pushed onto the active stack and of which the current node is a driver, is determined. The other drivers of the parent are sibling nodes to the current node. The sibling nodes are checked for a depth, and the maximum depth found plus one is assigned to the depth of the current node. Processing then proceeds to step 411, where the current node is removed from the active stack. The depth is returned at step 413 and the method ends. Processing may then proceed to a recursive call started by the parent node, or, if the recursion has finished, a new node may be chosen and the method invoked again at step 401.

Figure 4:
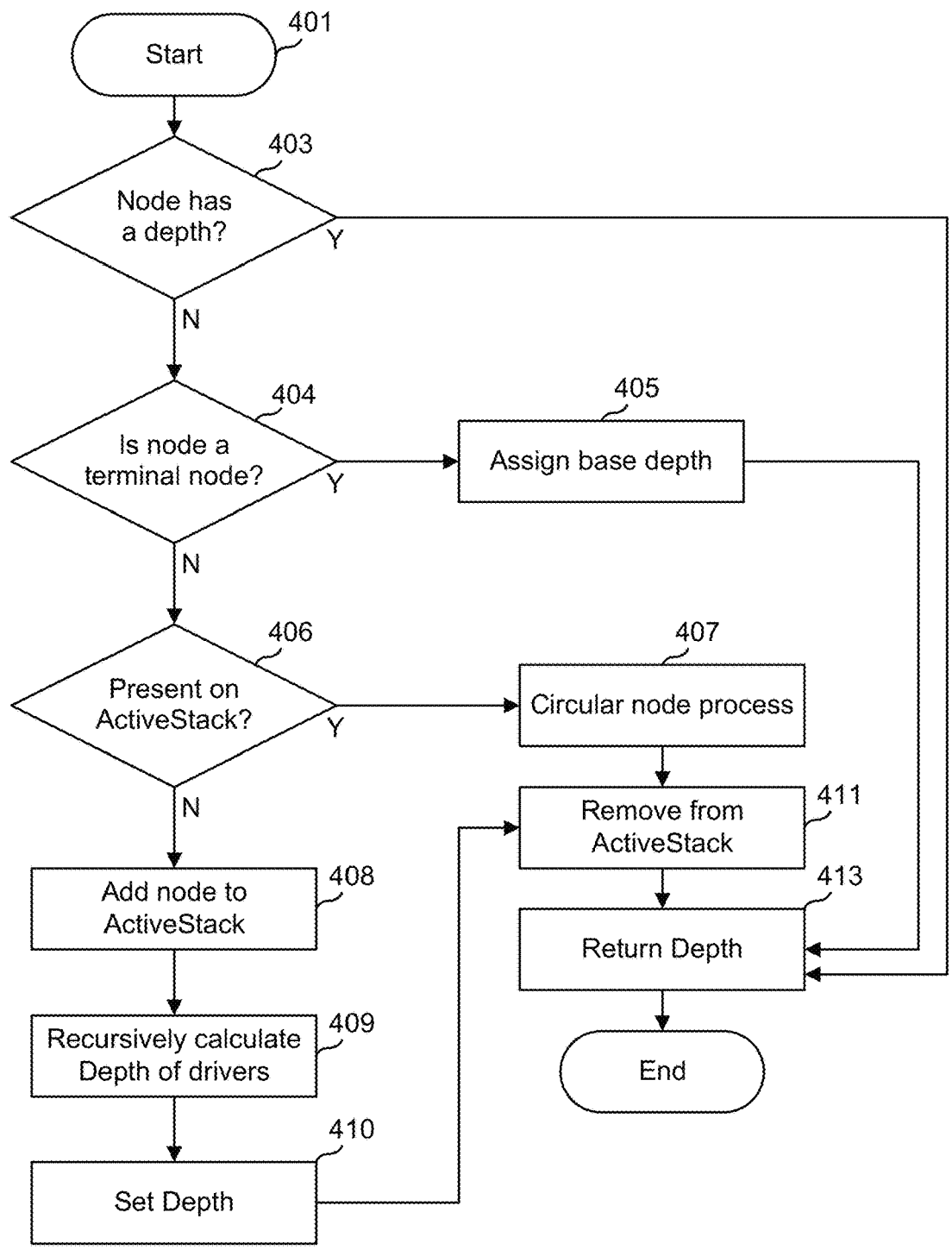
FIG. 4 illustrates a method of calculating node depth in accordance with one embodiment.

If, at step 406, the current node is not present on the active stack, then, at step 408, the current node is added to the active stack. At step 409, the method of FIG. 4 is recursively invoked for each of the driver nodes (child nodes in the directed graph data structure, represented by driver node objects) of the current node. In most cases, the method will assign a depth to the child nodes either because they form a chain of dependencies which ultimately lead to terminal nodes (which have a depth of the base depth) or form a chain of dependencies which leads to a circular node chain which is then processed by the circular node process. Once the driver nodes of the node have depths assigned in step 409, then, at step 410, the depth of the node is assigned the value of the maximum depth of its driver nodes, plus one. A global variable holding the maximum depth is checked to see if the current node's depth is greater, and, if so, the maximum depth is update to be the current nodes maximum depth.

At step 411, the processing of the node is complete and the node is removed from the Active stack. The method then ends.

The method of FIG. 4 is repeated until all nodes in the directed graph have been assigned a depth.

Once all nodes in the directed graph structure have been assigned a depth, the node depth process creates two depth analysis lists, each having entries ranging from the base depth (in some embodiments zero) to the maximum depth as assigned by the method of node depth calculation (FIG. 4). One depth analysis list contains circular nodes and one contains non-circular nodes. Each non-empty entry in each depth analysis list is itself a list of nodes having that depth. In one embodiment, the node depth process builds the depth analysis lists by going through the all nodes data structure. In an alternative embodiment, the directed graph structure may be traversed, though this may be less efficient in some cases. The node depth process adds each node to the depth analysis list having a depth corresponding to that node's depth, with the circular nodes added to the circular depth analysis list and the non-circular nodes added to the non-circular depth analysis list. While building the depth analysis lists, a node which corresponds to an actual value is added to the head of the depth analysis list, otherwise the node is added to the end of the depth analysis list.

Figure 5:
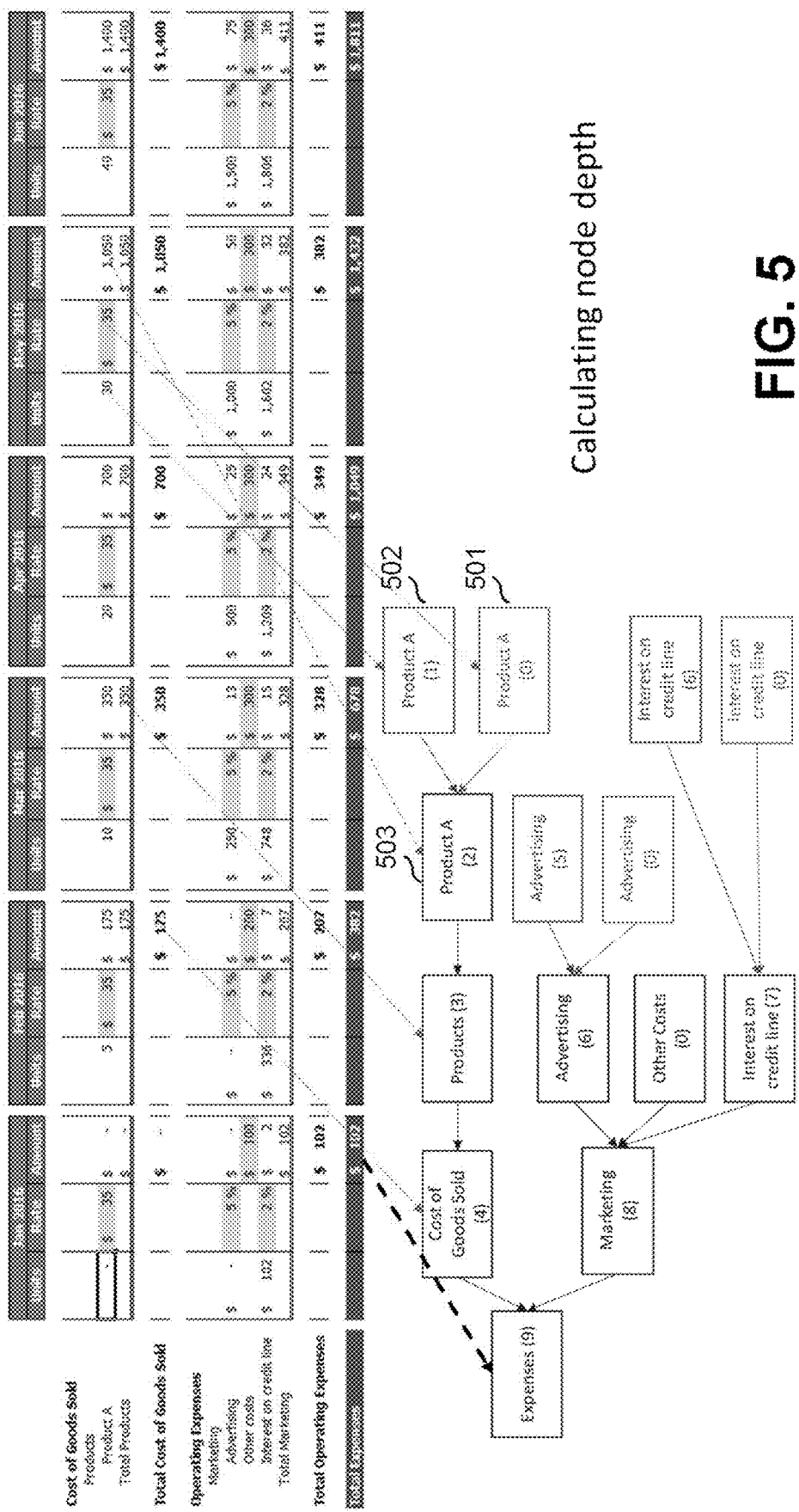
FIG. 5 illustrates a graph structure having nodes having different depths and the values in a complex system corresponding to the nodes.

FIG. 5 illustrates the correspondence from a complex system to a directed graph structure with depths. Looking at the May 2016 Product A cells (unit, rate, and amount), the unit and rate values are drivers of the amount value. The unit cell depends on another value (not shown). The rate value is known, so it corresponds to a terminal node 501, as indicated by a depth of zero, shown in node 501 in parentheses. The units value has a depth of one (shown in node 502) because it depends on another value, and the amount node 503 has a depth of two because it depends on unit and rate, the maximum depth of which is 1, and adding one to the maximum depth yields two, the depth of the Product A amount node 503.

Figure 6:
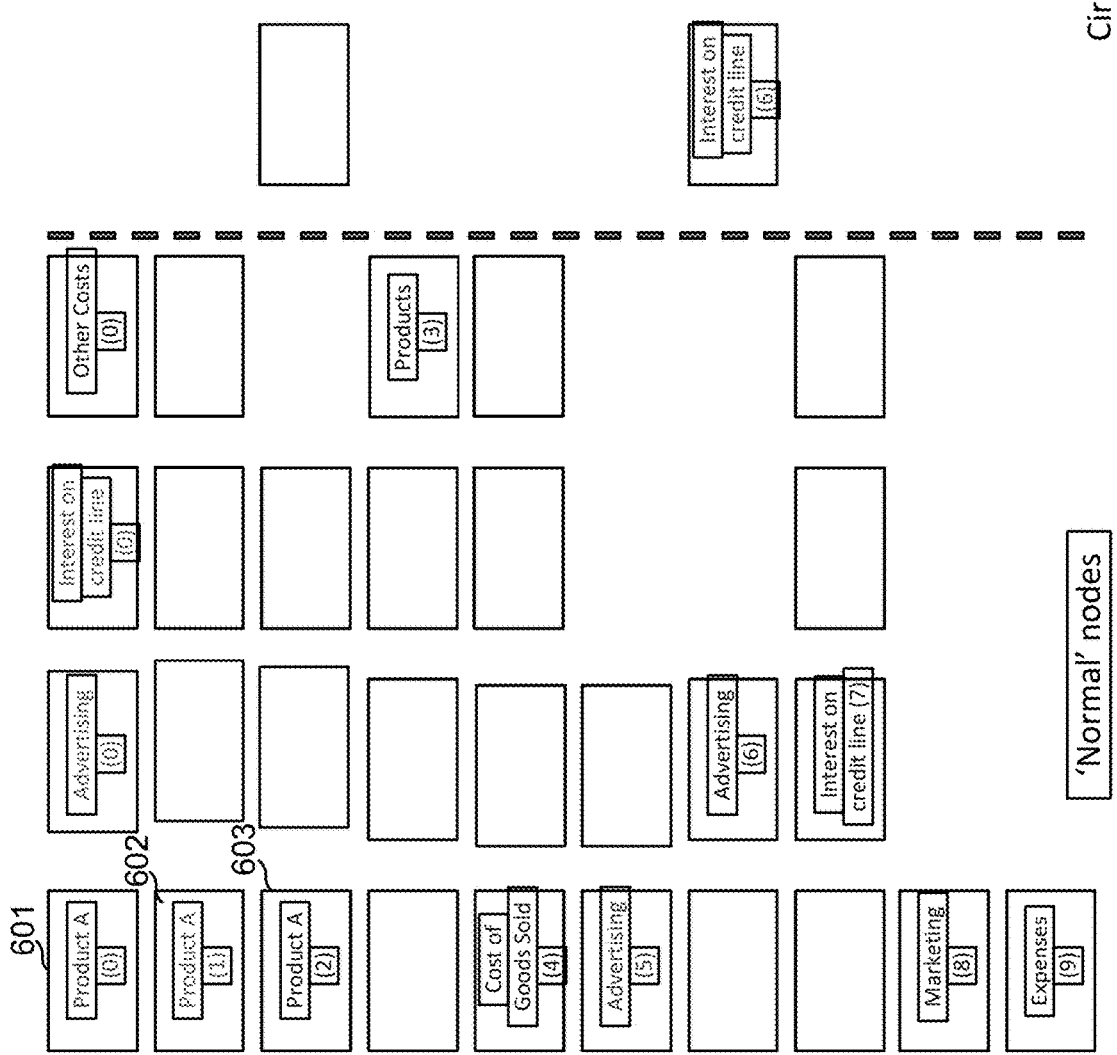
FIG. 6 illustrates a data structure having lists of nodes organized by depth.

FIG. 6 illustrates portions of the depth analysis lists corresponding to FIG. 5. Product A has a rate node 601 at the base depth (zero) corresponding to node 501 of FIG. 5, a unit node 602 at depth one corresponding to node 502 of FIG. 5, and an amount node 603 at depth 2 corresponding to node 503 of FIG. 5. Some of the depth entries may be empty lists, for example depth zero of the circular nodes depth list.

Once the cyclical and non-cyclical depth analysis lists are built, a node calculation process begins in which each entry is processed, beginning at the base depth and proceeding to max depth. At each pass through the depth lists, more cells will have their values calculated and be removed from the depth list, until no more nodes are left in the depth list entries or until a maximum number of passes over the depth analysis lists is reached. A node is calculable if all drivers of the node have known values, or stated alternatively, all cells reference by the node depend on cells having known values. For each depth, beginning with the base depth, each node on the depth list is processed, beginning with the head of the depth entry list to the back of the depth entry list. In some embodiments, the base depth may be empty because all values referenced by nodes having the base depth are known. If a node is calculable (all driver nodes have known values), then the node's referenced cell values are calculated and saved and the node is removed from the depth list. For example, in FIG. 5, Product A's rate node 501 has a depth of zero, so it is specified initially. Product A's unit node 502 depends on one or more other nodes, but those nodes should be at a depth of zero and specified, so, generally, Product A's unit node 502 will be calculated in an initial pass or an early pass through the depth lists. Once all values of the unit node 502 have been calculated, then all drivers of the product A amount node 503 have been calculated, and the product A amount node may be calculated and removed from the depth two entry list. After each pass through a specific depth entry in the non-circular (or normal) nodes depth list, processing may proceed to the corresponding depth entry in the circular nodes depth list.

Circular Node Processing

Figure 7:
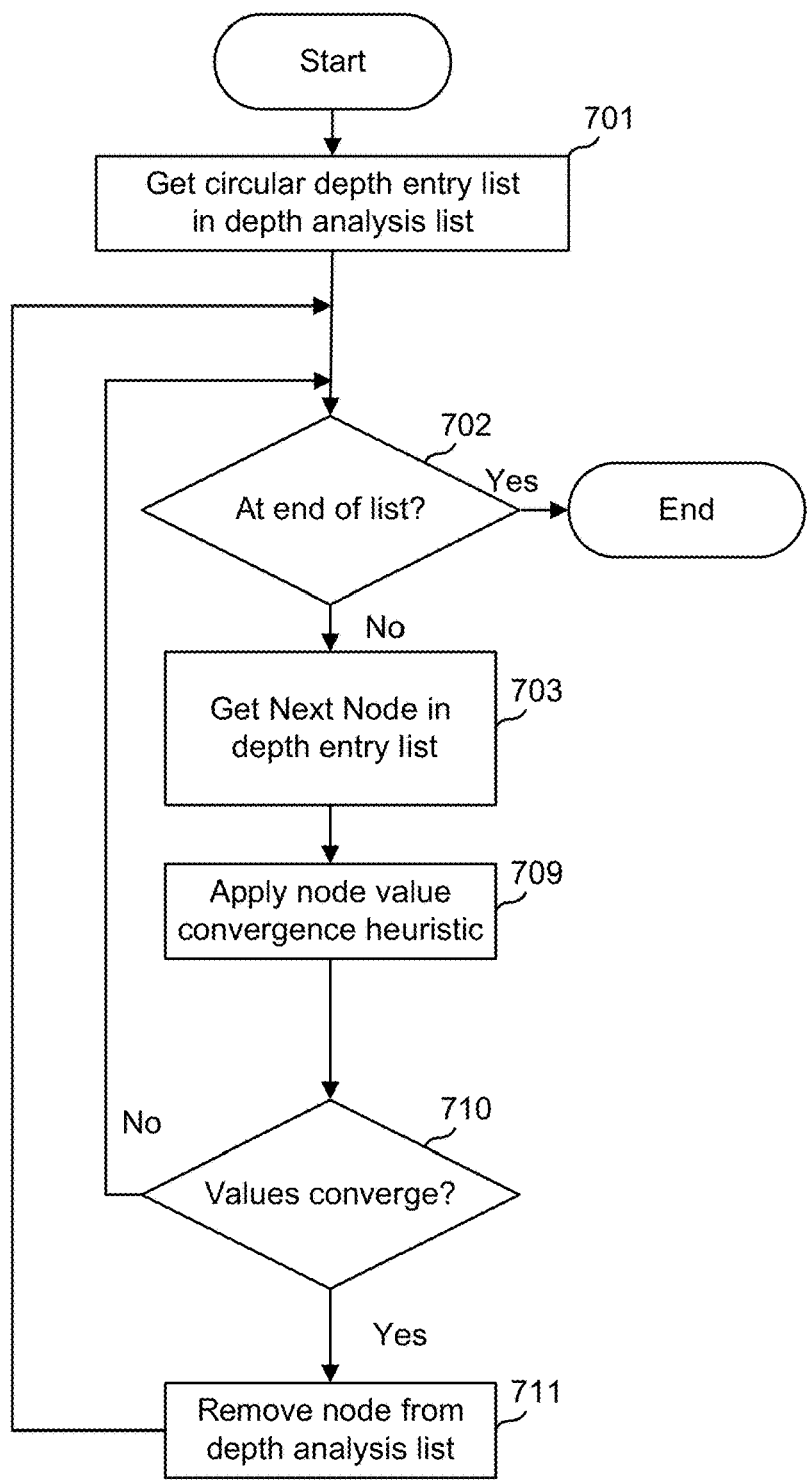
FIG. 7 illustrates a method of processing circular nodes.

As part of the node calculation process, a circular node process is applied to the circular depth list entry according to the method shown in FIG. 7. In step 701, the depth entry list of the circular depth analysis list is retrieved. This may be, in one embodiment, the circular depth entry list having the same depth as the most recently processed non-circular depth entry list. At 702, the system checks if the list is empty (end of list reached) and, if so, the method ends.

If the list is not empty, then at step 703, the next node of the circular depth entry list is retrieved as a current node to be processed.

At step 709, the circular node process applies a node value convergence heuristic to the circular chain. Different heuristics may be used, but in one embodiment, the circular chain containing the current node is retrieved. Nodes having aggregation calculations such as such as sum, mean, or other aggregating calculations are identified, including the current node. To apply the heuristic, nodes having aggregation calculations have their corresponding values set to zero, and those values are made available for calculation to dependent nodes. This is performed only once for each circular node on the circular chain.

For the current node, the circular node process constructs a list of nodes containing nodes calculated directly or indirectly from any nodes on the circular chain which also provide values back to any node on the circular chain. This list is called the inner dependents list, and may include the nodes on the circular chain. A list of nodes which are calculated directly or indirectly from the nodes on the circular chain, but do not provide values back to the nodes on the circular chain, is also constructed. This list is called the outer dependents list. The circular node process need only calculate the inner dependents list and outer dependents list once per circular node.

After the aggregating nodes' values are set to zero and the inner and outer dependents lists are constructed, the circular node process attempts to calculate the values of all nodes in the circular chain and the values of the inner dependents list. The resulting values of the current node are saved, and then the system attempts to again calculate the values for the current node.

At step 710, the circular node process determines if the values have converged. If the values have converged, as determined by the change between the saved value and the subsequently calculated value being less than a specified delta, then the circular node process determines if the values have also converged for the nodes on the inner dependents list and the outer dependents list. If the values do not converge, the current node is left on the circular depth analysis list and processing proceeds to a next node, if any, at step 702.

If the values do converge, then at step 711, the current node is calculated, its values stored, and the node removed from the depth analysis list. The values for the nodes in the outer dependents list are also calculated. Processing then proceeds at step 702, where the next node on the list, if any, is calculated. If the end of the list is reached or the list is empty, the process ends.

Processing continues up successive depths (higher depths) until the highest depth is reached. If there are still non-empty depth lists, processing begins at the lowest depth having a non-empty depth list. The process may end if a maximum number of loops through the depth lists is exceeded before all nodes are calculated.

Exemplary System

According to one embodiment, the techniques described herein are implemented by one or generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

Figure 8:
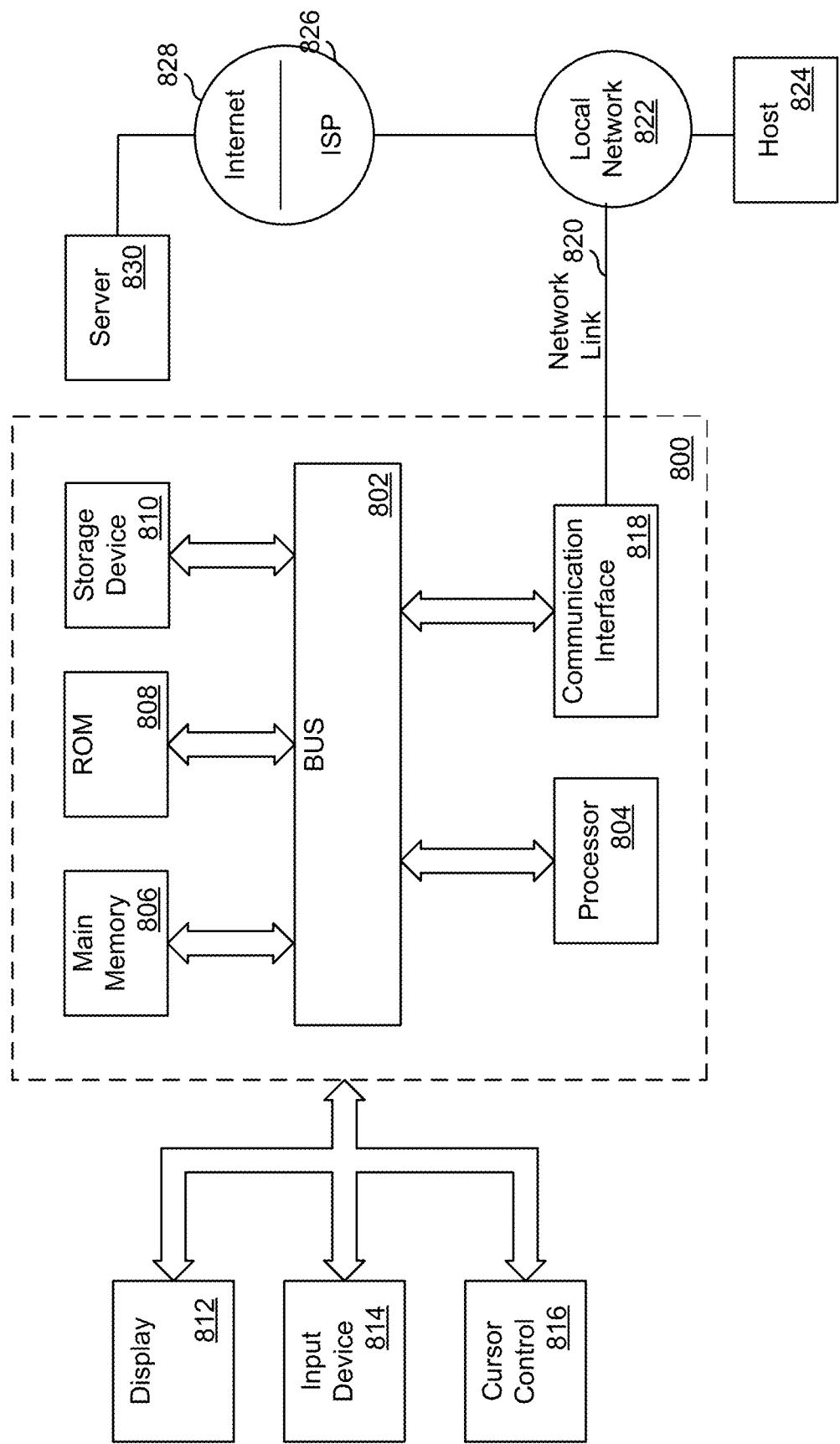
FIG. 8 illustrates an exemplary computer system for executing a method in accordance with one embodiment.

For example, FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a computer monitor, for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a network connection. A modem or network interface local to computer system 800 can receive the data. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. The received code may be executed by processor 804 as it is received, and/or stored in storage device 810, or other non-volatile storage for later execution.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A method for efficiently computing values for a data structure having cells and dependencies, the method comprising:
   receiving a system data structure encoding a system having a plurality of cells, each cell associated with one of a plurality of rows, each cell comprising either a cell value or a cell calculation, wherein at least one cell calculation has a dependency that takes as input contents of another cell;
   traversing the system data structure to produce a directed graph data structure, comprising:
   (a) instantiating a node object of a plurality of node objects of the directed graph data structure;
   (b) indicating, in the node object, multiple ones of the plurality of cells that the node object references, the multiple cells being within a row of the plurality of rows, at least one first node object of the plurality of node objects being a terminal node object that references ones of the plurality of cells with initially defined values and at least one second node object of the plurality of node objects being a non-terminal node object that references at least one cell comprising a particular cell calculation that has a particular dependency on a particular cell; and
   (c) storing in the non-terminal node object an edge structure of a plurality of edge structures, the edge structure indicating that the non-terminal node object is a parent node object and indicating a driver node object that references the particular cell;
   traversing the directed graph data structure to assign a depth value to each node object of the plurality of node objects such that (a) the depth value assigned to at least one terminal node object is a base depth, and (b) the depth value assigned to at least one non-terminal node object is based on a depth of the driver node object, traversing the directed graph data structure to assign the depth value to each node object of the plurality of node objects comprising causing multiple node objects referred to by a stack data structure to be referred to by a circular node list after determining that a current node object being traversed is referred to by the stack data structure;
   constructing a plurality of depth lists each referring to a portion of the plurality of node objects; and
   processing a depth list of the plurality of depth lists by, for each node object referred to in the depth list, calculating values of the multiple cells referenced by the node object after an evaluation determines the node object is calculable, removing the node object from the depth list after the evaluation determines the node object is calculable, the depth value assigned to each node object referred to in the depth list determining an order in which the portion of the plurality of node objects referred to in the depth list are evaluated.

2. The method of claim 1, wherein each cell of the plurality of cells is further associated with one of a plurality of time periods.

3. The method of claim 1, wherein traversing the directed graph data structure to assign the depth value to each node object of the plurality of node objects comprises:
   after determining that the current node object being traversed is not referred to by the stack data structure, adding a reference to the stack data structure to refer to the current node object; and
   after determining that the current node object being traversed is referred to by the stack data structure, creating the circular node list in memory, and labeling the current node object as a circular node.

4. The method of claim 3, wherein processing the depth list further comprises:
   after determining that a detected node object of the circular node list references an aggregation cell that includes an aggregation calculation:

(a) setting cell contents of the aggregation cell to a constant value;
(b) evaluating if repeated calculation of those of the plurality of the cells referenced by the multiple node objects of the circular node list produces a convergence of values;
(c) when the evaluation determines that a convergence of values is produced, assigning values from the convergence of values to those of the plurality of cells referenced by the multiple node objects of the circular node list and removing the detected node object from the depth list; and
(d) continuing to process the depth list.

5. The method of claim 1, wherein traversing the system data structure to produce the directed graph data structure further comprises:
for a first cell of the system data structure being processed, evaluating if a particular node object referencing the first cell has been instantiated; and
when the evaluation determines that the particular node object has been instantiated, evaluating if a dependency of the first cell to a second cell is on a preceding time period or a succeeding time period, and, if not, labeling the particular node object as circular and if so, labeling the particular node object as not circular.

6. The method of claim 5, wherein constructing the plurality of depth lists further includes labeling at least one first depth list as a circular depth list, the at least one first depth list referring to ones of the plurality of node objects each of which is labeled as circular.

7. The method of claim 6, wherein the plurality of depth lists further includes at least one second depth list labeled as non-circular, the at least one second depth list referring to ones of the plurality of node objects each of which is labeled as non-circular.

8. The method of claim 1, wherein each depth list of the plurality of depth lists has a count,
for each of the plurality of depth lists, the depth value assigned to each of the portion of the plurality of node objects referred to by the depth list corresponds to the count, and
processing the depth list is repeated for each depth list of the plurality of depth lists in a pass through the plurality of depth lists by sequentially processing the plurality of depth lists in increasing order of the count of each depth list.

9. The method of claim 8, wherein processing the depth list is repeated for each depth list of the plurality of depth lists until all of the plurality of depth lists are empty or until a maximum number of passes is reached.

10. A method for efficiently computing values for a data structure having cells and dependencies, the method comprising:
receiving a system data structure encoding a system having a plurality of cells, each cell associated with one of a plurality of rows, each cell comprising either a cell value or a cell calculation, wherein at least one cell calculation has a dependency that takes as input contents of another cell;
traversing the system data structure to produce a directed graph data structure and an all nodes list, the directed graph data structure comprising a plurality of node objects, each node object referencing multiple ones of the plurality of cells within a row of the plurality of rows and being labeled as either terminal or non-terminal, each node object further labeled as circular or non-circular, the all nodes list comprising a pointer to each node object of the plurality of node objects;
assigning a depth value to each node object;
constructing a plurality of depth lists, each depth list labeled as non-circular or circular, wherein each depth list labeled as non-circular contains at least a first portion of the plurality of node objects labeled as non-circular and each depth list labeled as circular contains at least a second portion of the plurality of node objects labeled as circular, constructing the plurality of depth lists comprising, for a current node object in the all nodes list, performing a depth process that comprises causing multiple node objects referred to by a stack data structure to be referred to by a circular node list based on a determination that the current node object being traversed is referred to by the stack data structure; and
processing a depth list in the plurality of depth lists according to a depth list process wherein, for each node object contained in the depth list, a plurality of values referenced by the node object are calculated and the node object removed from the depth list after an evaluation determines that the node object is calculable, the depth value assigned to each node object contained in the depth list determining an order in which those of the plurality of node objects contained in the depth list are evaluated.

11. The method of claim 10, wherein the depth list process is repeated for a maximum number of times while one of the plurality of depth lists refers to at least one node object.

12. The method of claim 10, wherein each of the plurality of cells is further associated with one of a plurality of times.

13. The method of claim 10, wherein the depth process comprises:
assigning a base depth to the depth value of the current node object when the current node object is labeled as being terminal;
based on a determination that the current node object is not referred to by the stack data structure, adding a reference to the stack data structure to refer to the current node object and recursively repeating the depth process for at least one driver node object of the current node object and assigning the depth value of the current node object based on a depth of the driver node object; and
based on the determination that the current node object being traversed is referred to by the stack data structure, creating the circular node list in memory, and labeling the current node object as circular.

14. The method of claim 13, wherein processing the depth list further comprises:
based on a determination that a detected node object of the circular node list references an aggregation cell that includes an aggregation calculation which depends a plurality of input cells:
(a) setting a plurality of cell contents of the plurality of input cells to a constant value;
(b) evaluating if repeated calculation of those of the plurality of cells referenced by the multiple node objects of the circular node list produces a convergence of values;
(c) when the evaluation determines that the convergence of values is produced, assigning values from the convergence of values to those of the plurality of cells referenced by the multiple node objects of the circular node list and removing the detected node object from the depth list; and
(d) continuing to process the depth list.

15. The method of claim 10, wherein each depth list of the plurality of depth lists has a count and refers to node objects having a depth value corresponding to the count, and the depth list process is repeated for each depth list of the plurality of depth lists in a pass through the plurality of depth lists, each pass including sequentially processing the plurality of depth lists in increasing order of the count of each depth list.

16. The method of claim 15, wherein each pass through the plurality of depth lists is repeated until all of the plurality of depth lists are empty or until a maximum number of passes is reached.

17. A computer system comprising one or more processors and a memory storing executable instructions that, as a result of being executing by the one or more processors, cause the computer system to:
receive a system data structure encoding a plurality of cells each associated with one of a plurality of rows, each cell comprising either a cell value or a cell calculation, wherein at least one cell calculation has a dependency that takes as input contents of another cell;
traverse the system data structure to produce a directed graph data structure by:
(a) instantiating a node object of a plurality of node objects of the directed graph data structure;
(b) referencing, in the node object, multiple ones of the plurality of cells, the multiple cells being within a row of the plurality of rows, at least one first node object of the plurality of node objects being a terminal node object that references ones of the plurality of cells with initially defined values and at least one second node object of the plurality of node objects being a non-terminal node object that references at least one cell comprising a particular cell calculation that has a particular dependency on a particular cell; and
(c) storing in the non-terminal node object an edge structure of a plurality of edge structures, the edge structure indicating that the non-terminal node object is a parent node object and indicating a driver node object that references the particular cell;
traverse the directed graph data structure to assign a depth value to each node object of the plurality of node objects such that (a) the depth value assigned to at least one terminal node object is a base depth, and (b) the depth value assigned to at least one non-terminal node object is based on a depth of the driver node object, traversing the directed graph data structure to assign a depth value to each node object of the plurality of node objects comprising causing multiple node objects referred to by a stack data structure to be referred to by a circular node list after determining that a current node object being traversed is referred to by the stack data structure;
construct a plurality of depth lists each referring to a portion of the plurality of node objects; and
process a depth list of the plurality of depth lists according to a depth list process by, for each node object referred to in the depth list, calculating values for the multiple cells referenced by the node object and removing the node object from the depth list after an evaluation determines the node object is calculable, the depth value assigned to each node object referred to in the depth list determining an order in which the portion of the plurality of node objects referred to in the depth list are evaluated.

18. The computer system of claim 17, wherein each depth list in the plurality of depth lists is processed according to the depth list process during a pass through the plurality of depth lists.

19. The computer system of claim 18, wherein the pass through the plurality of depth lists is repeated until all of the plurality of depth lists are empty or until a maximum number of passes is reached.

20. The computer system of claim 17, wherein traversing the system data structure to produce the directed graph data structure further comprises:
for a first cell of the system data structure being processed, evaluating if a particular node object referencing the first cell has been instantiated; and
when the evaluation determines that the particular node object has been instantiated, evaluating if a dependency of the first cell to a second cell is on a preceding time period or a succeeding time period, and, if not, labeling the particular node object as circular and if so, labeling the particular node object as not circular.

21. The computer system of claim 17, wherein traversing the directed graph data structure to assign the depth value to each node object of the plurality of node objects comprises:
after determining that the current node object being traversed is not referred to by the stack data structure, adding a reference to the stack data structure to refer to the current node object; and
after determining that the current node object being traversed is referred to by the stack data structure, creating the circular node list in memory, and labeling the current node object as a circular node.

22. The computer system of claim 21, wherein processing the depth list further comprises:
after determining that a detected node object of the circular node list references an aggregation cell that includes an aggregation calculation:
(a) setting cell contents of the aggregation cell to a constant value;
(b) evaluating if repeated calculation of those of the plurality of the cells referenced by the multiple node objects of the circular node list produces a convergence of values;
(c) when the evaluation determines that a convergence of values is produced, assigning values from the convergence of values to those of the plurality of cells referenced by the multiple node objects of the circular node list and removing the detected node object from the depth list; and
(d) continuing to process the depth list.

* * * * *